Patented Oct. 9, 1945

2,386,289

UNITED STATES PATENT OFFICE 2,386,289

TREATMENT OF PENTAERYTHRITOL

Joseph E. Bludworth, Cumberland, and Samuel B. Jeffries, Long, Md., assignors to Celanese Corporation of America, a corporation of Delaware No Drawing. Application February 16, 1943, Serial No. 476,048

4 Claims. (Cl. 260—637)

This invention relates to the treatment of pentaerythritol, and relates more particularly to the treatment of crude pentaerythritol in crystalline form in order to obtain a pentaerythritol substantially free from extraneous substances.

An object of our invention is to obtain highly purified pentaerythritol in an efficient and economical manner.

Another object of our invention is the provision of a novel method for the treatment of pentaerythritol to obtain pentaerythritol substantially free of extraneous substances.

Still another object of our invention is the provision of a novel method for the treatment of pentaerythritol requiring a relatively low steam consumption and involving a minimum of handling.

Other objects of our invention will appear from the following detailed description.

Pentaerythritol may be formed by the condensation of formaldehyde with acetaldehyde in alkaline media. In addition to pentaerythritol, this condensation reaction also produces some di-pentaerythritol, as well as small amounts of condensation products of high molecular weight. To separate the pentaerythritol in purified form from di-pentaerythritol and the higher condensation products the alkali present is first precipitated from solution as an insoluble sulfate or oxalate which is filtered off, and the clear liquid which remains after filtration is evaporated at reduced pressure to a small volume. On cooling the solution, pentaerythritol crystals precipitate and are removed from the solution in any convenient manner. These crystals are generally contaminated with various impurities which tend to give the crystals an undesirable color. To purify these impure, crude crystals, they are agitated at elevated temperature with less than enough water to dissolve them. At the end of about two hours time, pentaerythritol has crystallized from the solution in a purified form and the purified crystals are separated from the hot mother liquor by filtration. The impurities which were present are carried away with the hot mother liquor.

We have discovered that the hot mother liquor may be employed to free additional crude pentaerythritol crystals of their impurities without subjecting the mother liquor to any intermediate purification treatment.

In accordance with our process, crude pentaerythritol crystals are added to the hot mother liquor and the resulting slurry, comprising crystals and hot mother liquor, is agitated while being maintained at an elevated temperature. When the treatment is completed, the purified crystals are separated from the hot mother liquor and the latter may again be employed to free yet another batch of crude pentaerythritol crystals of impurities. The purification process is carried out without further evaporation of water from the slurry of hot mother liquor and crystals. When the hot mother liquor becomes too impure for further use it may then be sent to a primary portion of the process for re-treatment and the pentaerythritol remaining in solution may be separated therefrom in the usual manner. By employing the hot mother liquor for the purification of large quantities of crude pentaerythritol in accordance with our invention, a substantial saving in steam is effected, and our process involves relatively little labor and processing in order to obtain purified crystalline pentaerythritol. Thus, for example, we have found that for the production of a given quantity of purified pentaerythritol from crude crystals, our novel process requires from one-sixth to one-tenth of the quantity of steam normally consumed in the processes heretofore employed, wherein the pentaerythritol is subjected to purification processes involving the evaporation of large quantities of water from the mother liquors.

In order further to illustrate our invention but without being limited thereto, the following example is given:

Example 2000 parts by weight of crude pentaerythritol crystals are entered into 1000 parts by weight of water contained in a suitable vessel provided with stirring and heating means. The temperature of the saturated solution thus obtained is raised nearly to boiling, i. e. about 104° C., and stirred continuously for about two hours while being maintained at this temperature. At the end of this two-hour period the contents of the vessel are discharged through a screen which retains the undissolved crystals but permits the hot saturated mother liquor to pass through. The pentaerythritol crystals obtained are in a highly purified form. If necessary, the crystals may be sprayed lightly with wet steam to remove any adhering liquor. A filter or centrifuge may also be employed to separate the purified crystals from the hot mother liquor.

To the hot, saturated mother liquor there is now added 1000 parts by weight of crude pentaerythritol crystals and the hot slurry is stirred for 2 hours while being maintained at about 104° C. The undissolved crystals remaining after this treatment is completed are separated from the hot mother liquor in the manner described, and the hot mother liquor may again be employed for producing further quantities of purified pentaerythritol crystals. By our purification process, from about 6 to 10 parts by weight of purified crystals may be obtained from 1 part by weight of water before the mother liquor obtained becomes saturated with impurities and must be discarded. The discarded mother liquor may then be treated by the usual, conventional processes to obtain the pentaerythritol dissolved therein.

It is to be understood that the foregoing detailed description is given merely by way of illustration and that many variations may be made therein without departing from the spirit of our invention.

Having described our invention, what we desire to secure by Letters Patent is:

1. Process for the production of purified pentaerythritol, which comprises adding crude crystals of pentaerythritol to a hot, saturated aqueous solution thereof, agitating the resulting solution while maintaining it at an elevated temperature near the boiling point thereof and without effecting any substantial change in volume, and separating purified pentaerythritol crystals from the hot saturated solution.

2. Process for the production of pentaerythritol, which comprises adding crude crystals of pentaerythritol to a hot, saturated aqueous solution thereof, agitating the resulting solution while maintaining it at an elevated temperature near the boiling point thereof and without effecting any substantial change in volume, separating purified pentaerythritol crystals from the hot, saturated solution, and employing the hot, saturated aqueous solution again in like manner for effecting the purification of further quantities of crude pentaerythritol crystals.

3. Process for the production of purified pentaerythritol, which comprises adding crude crystals of pentaerythritol to a hot saturated aqueous solution thereof, agitating the resulting solution for about two hours while maintaining the solution and crystal slurry at about 104° C., draining the hot saturated solution from the purified pentaerythritol crystals, and employing the said hot saturated aqueous solution again in like manner for effecting the purification of further quantities of crude pentaerythritol crystals.

4. Process for the production of purified pentaerythritol, which comprises adding crude crystals of pentaerythritol to a hot saturated aqueous solution thereof, agitating the resulting solution while maintaining it at about 104° C., separating purified pentaerythritol crystals from the hot saturated solution, and spraying the separated purified crystals with wet steam to remove adhering liquor therefrom.

JOSEPH E. BLUDWORTH.
SAMUEL B. JEFFRIES.